(12) United States Patent
Zhu

(10) Patent No.: US 9,097,325 B2
(45) Date of Patent: Aug. 4, 2015

(54) MOTORIZED DRIVE SYSTEM AND METHOD FOR ARTICULATING A JOINT

(75) Inventor: Jianchao Zhu, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 14/236,655

(22) PCT Filed: Aug. 6, 2012

(86) PCT No.: PCT/US2012/049744
§ 371 (c)(1),
(2), (4) Date: Mar. 21, 2014

(87) PCT Pub. No.: WO2013/022833
PCT Pub. Date: Feb. 14, 2013

(65) Prior Publication Data
US 2014/0190289 A1  Jul. 10, 2014

Related U.S. Application Data

(60) Provisional application No. 61/515,485, filed on Aug. 5, 2011.

(51) Int. Cl.
*F16H 21/16*  (2006.01)
*B25J 9/10*  (2006.01)
*A61H 1/02*  (2006.01)
*A61H 3/00*  (2006.01)

(52) U.S. Cl.
CPC ................. *F16H 21/16* (2013.01); *B25J 9/104* (2013.01); *A61H 1/0262* (2013.01); *A61H 3/00* (2013.01); *Y10T 74/18832* (2015.01); *Y10T 74/18848* (2015.01)

(58) Field of Classification Search
USPC .................................................... 180/8.1, 8.6
See application file for complete search history.

(56) References Cited

U.S. PATENT DOCUMENTS

| 2,850,839 | A | 9/1958 | Bogart |
| 2006/0249315 | A1 | 11/2006 | Herr et al. |
| 2009/0171469 | A1 | 7/2009 | Thorsteinsson et al. |
| 2011/0066088 | A1 | 3/2011 | Little et al. |
| 2011/0266508 | A1* | 11/2011 | Karguth et al. ............... 254/392 |

OTHER PUBLICATIONS

U.S. Patent and Trademark Office, Search Report and Written Opinion in International Patent Application No. PCT/US2012/049744 dated Oct. 26, 2012 (9 pages).

* cited by examiner

*Primary Examiner* — Kevin Hurley
(74) *Attorney, Agent, or Firm* — Wood, Herron & Evans, LLP

(57) ABSTRACT

A motorized drive system and method for articulating an articulated joint having a motor and an elastic cable. The elastic cable is operatively connected to both the motor and the articulated joint such that the motor articulates the joint via the elastic cable. In addition, the elastic cable is adapted to be sufficiently elastic such that the motorized drive system is configured to use one motor for each degree of freedom through which the articulated joint moves.

20 Claims, 5 Drawing Sheets

MOTORIZED DRIVE SYSTEM AND METHOD FOR ARTICULATING A JOINT

CROSS-REFERENCE TO RELATED APPLICATIONS

The application claims the filing benefit of U.S. Provisional Patent Application Ser. No. 61/515,485 filed on Aug. 5, 2011, which is incorporated by reference herein in its entirety.

TECHNICAL FIELD

The present invention relates generally to a motorized drive system and method for articulating a mechanical joint, such as a joint of a robot or a prosthetic limb, and more particularly, to articulating a mechanical joint with a cable.

BACKGROUND

Advances in the mechanical, electrical, and controls arts are bringing robots and similar mechanical devices closer to achieving physical tasks traditionally performed by humans. As such, many of these robots require articulated joints to complete these tasks. For example, some state-of-the-art legged robots walk with bipedal movement to traverse from one point to another. Many of these articulated joints employ joint-mounted motors to articulate the articulated joint. Such joint-mounted motors simplify controls for the articulated joint, but result in joint assemblies that are heavy and bulky.

A cable-driven joint is known to reduce the weight and size on these articulated joints. Rather than mounting the motor on the joint, the motor is mounted to a main body of the robot. Accordingly, non-stretchable cables extend from the body-mounted motor to the articulated joint assembly so that the joint may articulate as desired. While body-mounted motors successfully reduce the weight of the articulated joint, the cable-driven joint is more difficult to control because non-stretchable cables generally require an additional motor for each joint. Thus, the overall weight, cost, and complexity of the robot tend to increase for cable-driven joints.

Furthermore, both the joint-mounted drive unit and the non-stretchable cable-driven drive unit create rigidity in the articulated joint not present in biological joints, such as human joints. This rigidity leaves the articulated joint susceptible to forces and impacts that create imbalance and stress in the robot and increases energy consumption in order to overcome the impact. More particularly, energy consumption is increased, because the energy cannot be effectively absorbed and transferred into kinetic energy while propelling the body forward. This is in stark contrast to a biological joint that is capable of absorbing and transferring kinetic energy for this purpose. Thus, joint-mounted and non-stretchable cable motorized drive units for use with mechanical articulating joints are presently less capable than the biological counterpart.

There is a need for a motorized drive system and method for articulating a mechanical joint, such as the mechanical joint of a robot, that addresses present challenges and characteristics such as those discussed above.

SUMMARY

The present invention is premised on the discovery that many of the problems associated with cable driven articulated joints can be addressed by the use of relatively stretchable elastic cables. One embodiment of a motorized drive system for an articulated joint assembly comprises a motor operatively connected to a joint by an elastic cable. The joint is coupled to the elastic cable such that the motor flexes the joint via the elastic cable.

In various aspects, the motorized drive system has a pulley mounted to the motor that engages the elastic cable. The pulley has a variable radius adapted to balance the tension along the elastic cable, which has a variable length for flexing the joint. Furthermore, the drive system has a plurality of guide rings for being operatively affixed to the articulated joint assembly such that the elastic cable extend through the plurality of guide rings for directing the articulation of the joint along a predetermined path.

In another embodiment, an articulated joint assembly and motorized drive system for use with a robot includes a main body, a motor mounted to the main body, and a pulley. The pulley is driven by the motor. In addition, a first leg member is pivotally mounted to the main body at a hip joint, and a second leg member is pivotally mounted to the first leg member at an articulated joint.

A plurality of guide rings are positioned along the first and second leg members with an elastic cable extending therethrough. The elastic cable engages the pulley such that the plurality of guide rings provides a predetermined path for the elastic cables. The motor moves the cables back and forth via the pulley to flex joints back and forth.

To move the joint, the motor rotates the pulley, in turn pulling or releasing the elastic cable when pulled. One elastic cable is stretched from a first length to a second length as the joint flexes and is released from the second length to the first length. The elastic cables are run through the plurality of guide rings along a predetermined path so that the articulated joint articulates along a defined path.

The present invention, having the elastic cables, flexes the articulated joint back and forth along one degree of freedom with one electric motor, which reduces the weight and cost of the motorized drive system relative to other cable driven joints. Moreover, the elastic cables absorb impacts to the joint assemblies that may either be stored as potential energy or dissipated in such a way as to maintain smooth movement of the articulated joint. By storing impact energy as potential energy, the potential energy may be converted to kinetic energy to propel the body forward to improve performance of the motor.

Various additional objectives, advantages, and features of the invention will be appreciated from a review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
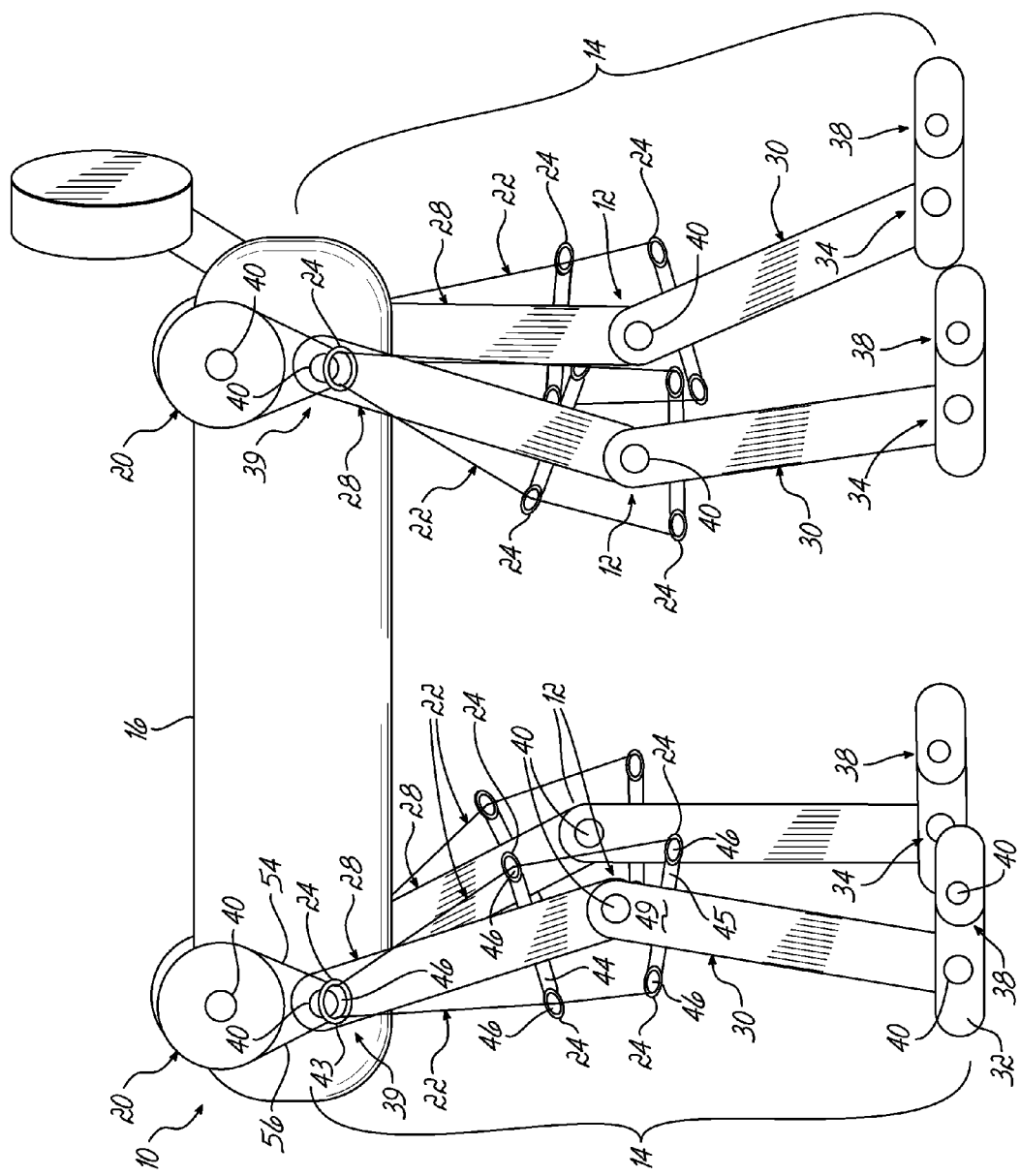
FIG. 1 is a schematic side view of one embodiment of the device.

With reference to FIG. 1, an exemplary embodiment of the motorized drive system 10 for actuating an articulated joint 12 a member assembly 14 has the motorized drive system 10 attached to a main body 16. As shown in FIG. 1, a plurality of the articulated joints 12 and motorized drive systems 10 are each connected to the main body 16 to form a quadruped robot 18. This embodiment of the robot 18 includes articulated member assemblies 14, otherwise referred to herein as leg assemblies 14, having the articulated joints 12 that mimic the biological joints of a cat, in the form of a knee joint 12. It will be appreciated, however, that generally the knee joints 12 and leg assemblies 14 may be assembled or otherwise configured to move along any defined path for any form of robot 18 having knee joints 12.

The embodiment of the invention shown in FIG. 1 has four motorized drive units 10 connected to four leg assemblies 14, which are each attached to the main body 16 and positioned relative to the main body 16 to balance the robot 18. Each of the leg assemblies 14 is operatively driven such that the robot 18 can traverse about an area, or otherwise "walk."

In order for the robot 18 to walk, the leg assemblies 14 each operate in conjunction with each other during a walking cycle. Each walking cycle for each leg assembly 14, otherwise referred to as a "leg," consists of a support phase and a swing phase. During the support phase, a leg assembly 14 supports and balances the robot 18 while engaging the ground to move the robot 18. During a swing phase, a leg assembly 14 generally flexes the knee joint 12, lifting the leg assembly 14 above the ground and forward, returning to the start of the support phase. At which point, the support phase and swing phase of each leg is repeated in conjunction with the other legs so that the robot 14 essentially walks.

Each leg assembly 14 is driven to walk, or otherwise move through a defined path for the support and swing phases, by the motorized drive system 10. The motorized drive system 10 includes a pulley 20 engaging an elastic cable 22 that is connected to the leg assembly 14. As described herein, the term elastic cable and stretchable cable may be used interchangeably. Furthermore, in order to move the leg assembly 14 and knee joint 12 along the defined path, a plurality of guide rings 24 are attached, directly or indirectly, to the leg assembly 14. The elastic cable 22 extends through the guide rings 24 such that the elastic cable 22 is limited to a predetermined path. The predetermined path of cable actuation predicatively moves the leg assembly 14 and knee joint 12 along the defined path to walk the robot 18 according to the embodiment.

Figure 2:
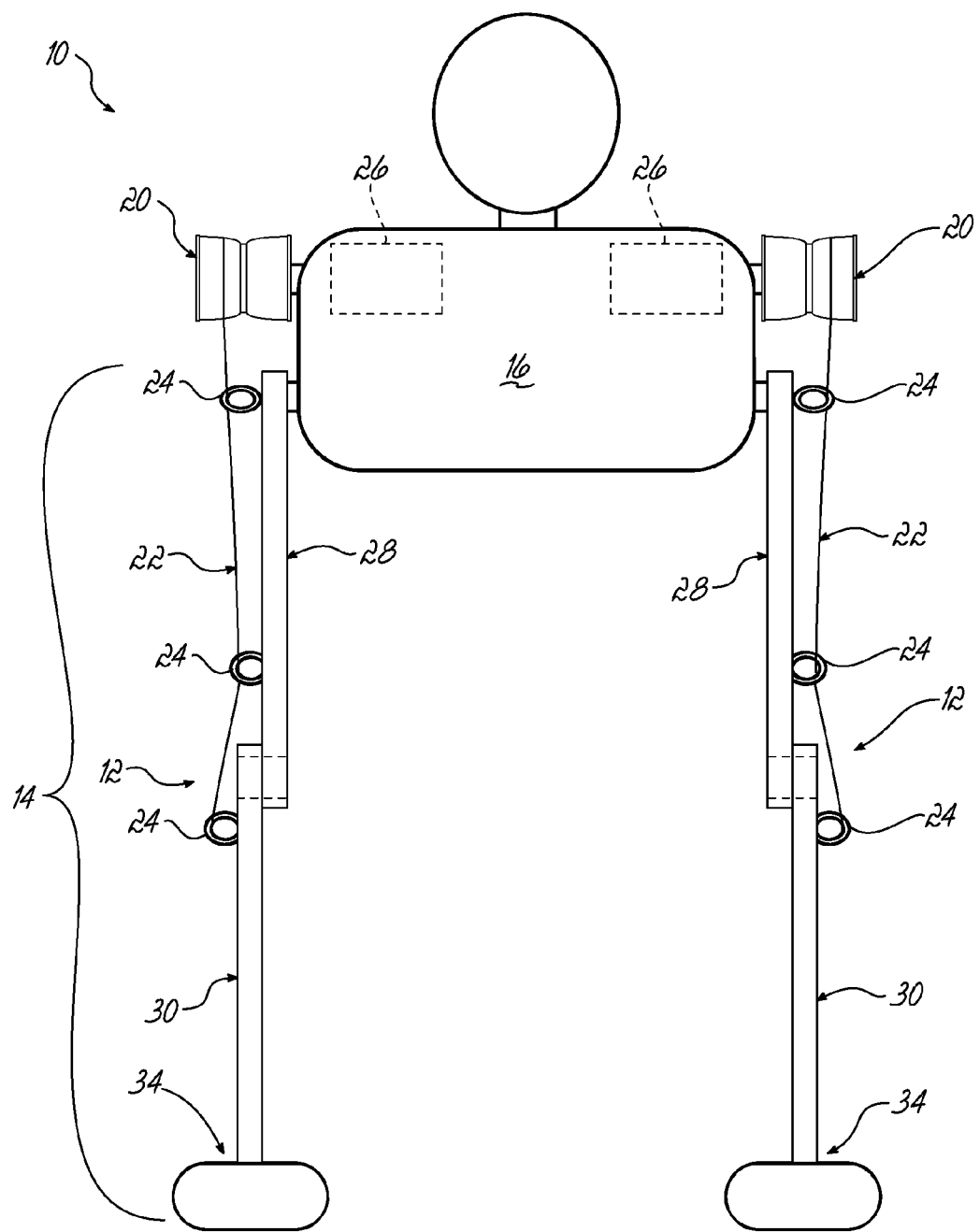
FIG. 2 is a schematic rear view of the embodiment shown in FIG. 1.

As shown in FIG. 2, the motorized drive system 10 actuates the elastic cable 22 via the pulley 20, which is rotated by a motor 26 mounted to the main body 16. According to the embodiment, the motor 26 directly drives the pulley 20; however, the motor 26 may also indirectly drive the pulley 20 through any known mechanical structure for transferring force. Moreover, the embodiment of FIGS. 1-2 show the leg assembly 14, the pulley 20, and the motor 26 each mounted to the main body 16. While the main body 16 conveniently positions these components fixed relative to each other, other known mechanical structures for fixing the pulley 20, the motor 26, and the leg assembly 14 relative to each other may be used.

Figure 3:
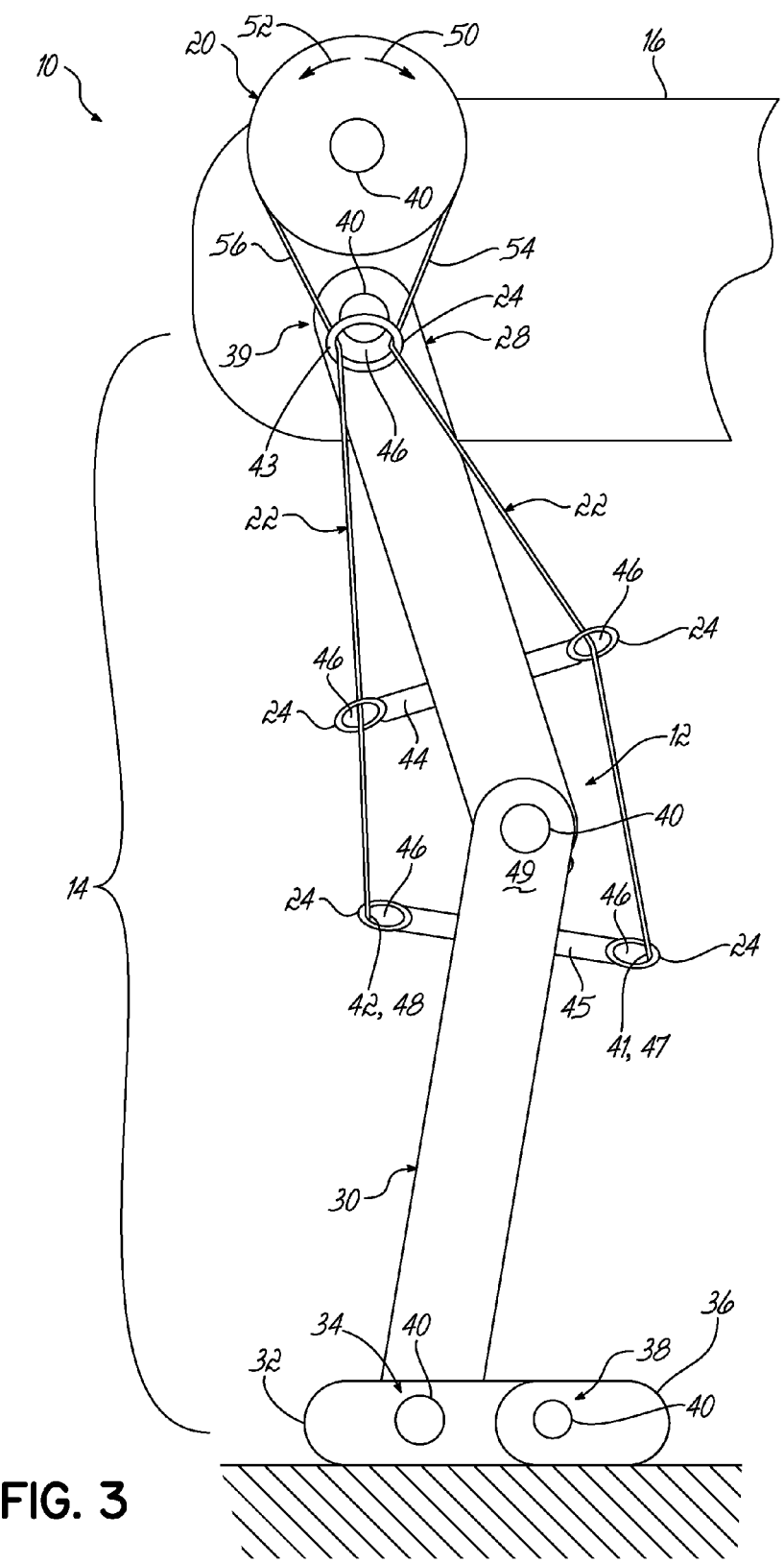
FIG. 3 is a schematic side view of the articulated member assembly according to the embodiment shown in FIG. 1.

As shown in FIG. 3, the pulley 20 engages the elastic cable 22, which is coupled to the knee joint 12 such that the motor 26 may articulate the knee joint 12. More specifically, the leg assembly 14, which includes the knee joint 12, also includes a first leg member 28 and a second leg member 30 pivotally coupled at the knee joint 12. A base member 32 is coupled to the second leg member 30 at an ankle joint 34. In addition, the embodiment of the leg assembly 14 also includes a front base member 36 connected to the base member 32 at a base joint 38 to assist in balance.

Accordingly, the first leg member 28 of the leg assembly 14 is coupled to the main body 16 at a hip joint 39. As shown in the present embodiment, the hip joint 39, the knee joint 12, and the ankle joint 34 are each pivotable with one degree of freedom, basically about a hinge pin 40. It will be appreciated, however, that joints with more than one degree of freedom, such as spherical joints, may be used. As such, the principles of the present invention may be readily applied to joints having more than one degree of freedom. Furthermore, the joints, such as the knee joint 12, may be limited along the defined path by a stop surface (not shown), or other limited device, to restrict the movement of the joint from and prevent angular hyperextensions of the joint to improve stability.

Further, the leg assembly 14 will be limited to movement along the defined path by limiting the rotational movement of each joint as required to achieve the defined path. Accordingly, the defined path is achieved by actuating first and second ends 41, 42 of the elastic cable 22 along the predetermined path defined by the placement of a plurality of guide rings 24 through which the elastic cable 22 extends. First and second ends 41, 42 of cable 22 extend from the pulley 20 through an initial guide ring 43 fixed to first leg member 28. Each of the plurality of guide rings 24 is affixed, directly or indirectly, along the first and second leg members 28, 30 of the leg assembly 14 to direct the elastic cable 22 along the predetermined path. As shown in FIG. 3, the assembly involves indirectly mounted guide rings 24. First and second guide members 44, 45 extend perpendicularly from the first and second leg members 28, 30. Each guide member 44, 45 has guide rings 24 attached thereto in order to extend the elastic cable 22 outward from the first and second leg members 28, 30. The elastic cable 22 extends slidably through a portion of the plurality of guide rings 24 for directing the predetermined path of the elastic cable 22 without fixing the elastic cable thereto. More particularly, each guide ring 24 has a guide hole 46 through which the elastic cable 22 slides. However, each cable end 41, 42 is rigidly affixed, rather than slidably affixed, to the first and second final guide rings 47, 48 for directing the leg assembly 14 through either the support phase or swing phase. The two ends 41, 42 of elastic cable 22 are attached to final guide rings 47, 48 which are fixed to either side of a distal portion 49 of second leg member 30. The elastic cable 22, when actuated, creates sufficient torque about the knee joint 12 for rotating the knee joint 12 through the support phase and the swing phase. While this embodiment of the invention uses a plurality of guide rings 24 to direct the elastic cable 22, it will be appreciated that any structure capable of directing the elastic cable 22 may be used. For instance, a continuous tubing (not shown) may also be used to surround the elastic cable 22 and direct the elastic cable 22 along the predetermined path.

As the elastic cable 22 is actuated by the pulley 20 along the predetermined path, the elastic cable 22 responds by forcibly acting on the final guide rings 47, 48, which transmits force to the first and second leg members 28, 30. Moving the elastic cable 22 a first direction 50 forcibly directs the first and second leg members 28, 30 through the support phase. In contrast, actuating the elastic cable 22 a second direction 52 forcibly directs the first and second leg members 28, 30 through the swing phase.

As previously discussed, cable 22 has generally substantial elastic material properties. The elastic cable 22 actuates the knee joint 12 through both the support phase and the swing phase along a single degree of freedom with only one motor 26 actuating the elastic cable 22. Accordingly, the motorized drive system 10 having the elastic cable 22 is capable of pairing one motor 26 with each degree of joint freedom, rather than requiring two motors for each degree of freedom. More particularly, the elasticity of the elastic cable 22 is configured so as to accommodate the remaining difference in the traveling distance of the cable on either side of the leg members 28, 30 after what has been accommodated by the pulley 22, while providing the desired impact or shock absorbing effect. Depending on the geometry of the leg members 28, 30 and the design of the pulley 20, the maximum stretch of the elastic cable 22 is generally less than 5%-10% by a maximum force.

Furthermore, the elastic cable 22 positioned along the predetermined path for articulating the knee joint 12 remains generally in tension regardless of being driven the first direction 50 or the second direction 52 along the one degree of freedom. Thus, regardless of actuation in the first or second directions 50, 52, the pulley 20 drives, or pulls, the entirety, i.e. both ends 41, 42, of the actuation cable 22 with one motor 26. In contrast, the generally non-stretchable cable is driven, or pulled, at each end to maintain useful tension in the cable, requiring two motors.

Moreover, a first cable segment 54 of the elastic cable 22 being generally in the first direction 50 stretches elastically further during the swing phase than a second cable segment 56 being generally in the second direction 52. While a generally non-stretchable cable would seize the knee joint 12, the elastic cable 22 elastically stretches to complete the swing phase. In addition, the elastic stretch of the elastic cable 22 stores potential energy that can be transferred to kinetic energy during the support phase, which would perform similarly. Accordingly, the elastic cable 22 is manufactured of an elastic material adapted to effectively articulate the knee joint 12 along one degree of freedom with each operatively connected motor 26. In addition, the first and second cable segment 54, 56 may each be separate, individual cables.

Figure 4:
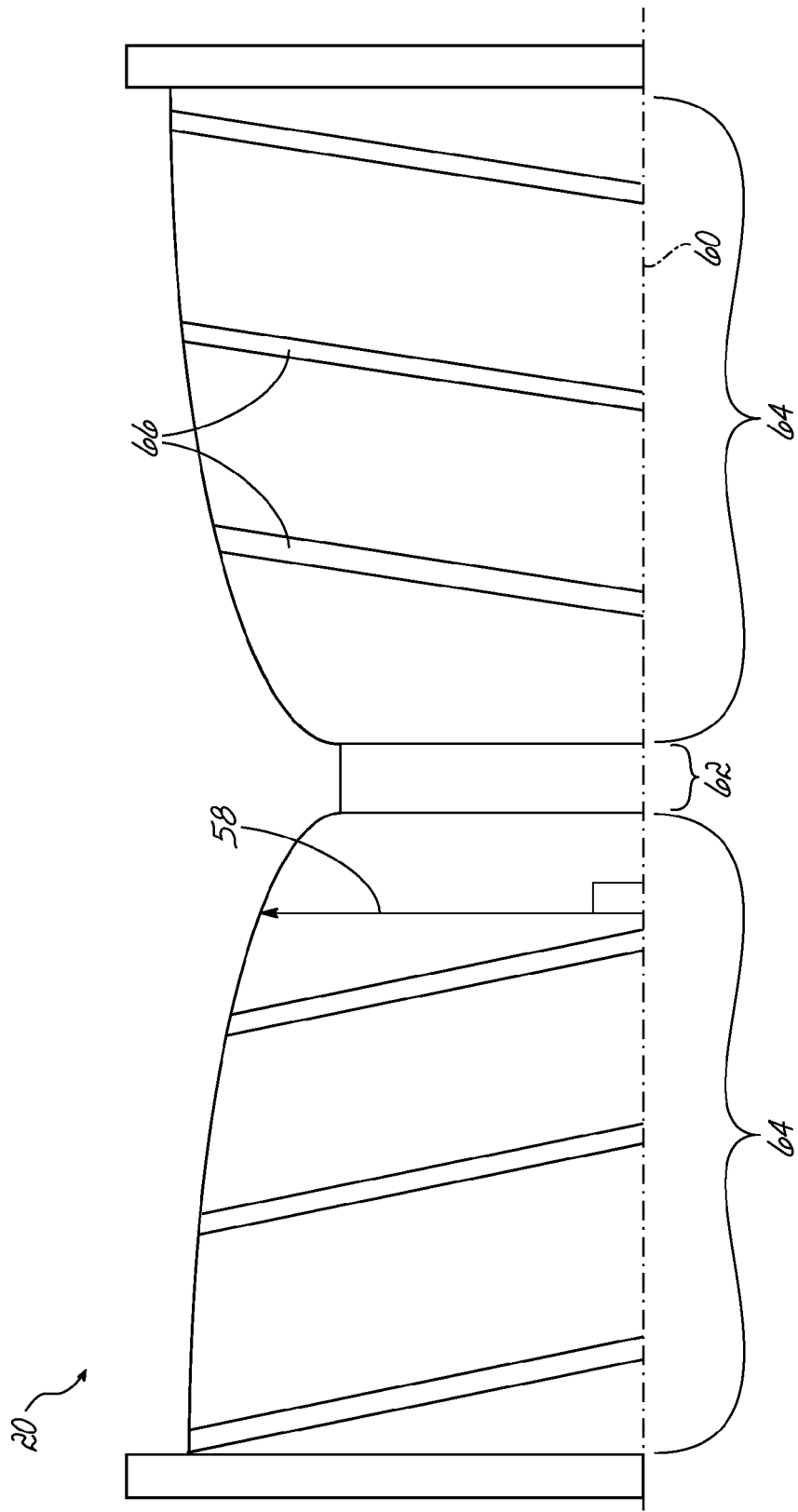
FIG. 4 is a schematic top view of a pulley along an axis of rotation according to the embodiment shown in FIG. 1.

As discussed herein, the first cable segment 54 and the second cable segment 56 each have a variable length along the predetermined path as the leg assembly 14 moves along the defined path through the support phase and the swing phase, which stretches the variable length from a first length to a second length respectively. In order to equalize the tension between the first and second cable segments 54, 56, the pulley 20 has a variable radius 58 from an axis of rotation 60 to accommodate the variable length for articulating the knee joint 12 as shown in FIG. 4. As such, the variable radius 58 is relatively small at a central portion 62 of the pulley 20 and increases along an outer portion 64.

The desirable variable radius 58 of the pulley 20 with respect to the knee joint 12 selected for use with the motorized drive unit 10 is selected such that the rotational angle of the pulley 20 is generally proportional to the rotational angle of the knee joint from the first to the second length of the elastic cable 22. In order to position the elastic cable 22 at the desirable variable radius 58, a plurality of helically positioned guide grooves 66 guide the elastic cable 22 for maintaining the proportional rotational angle between the pulley 20 and the knee joint 12. Thereby, the elastic cable 22 adjusts to the desirable variable radius 58 such that the tension between the first and second cable segments 54, 56 is equalized.

Figure 5:
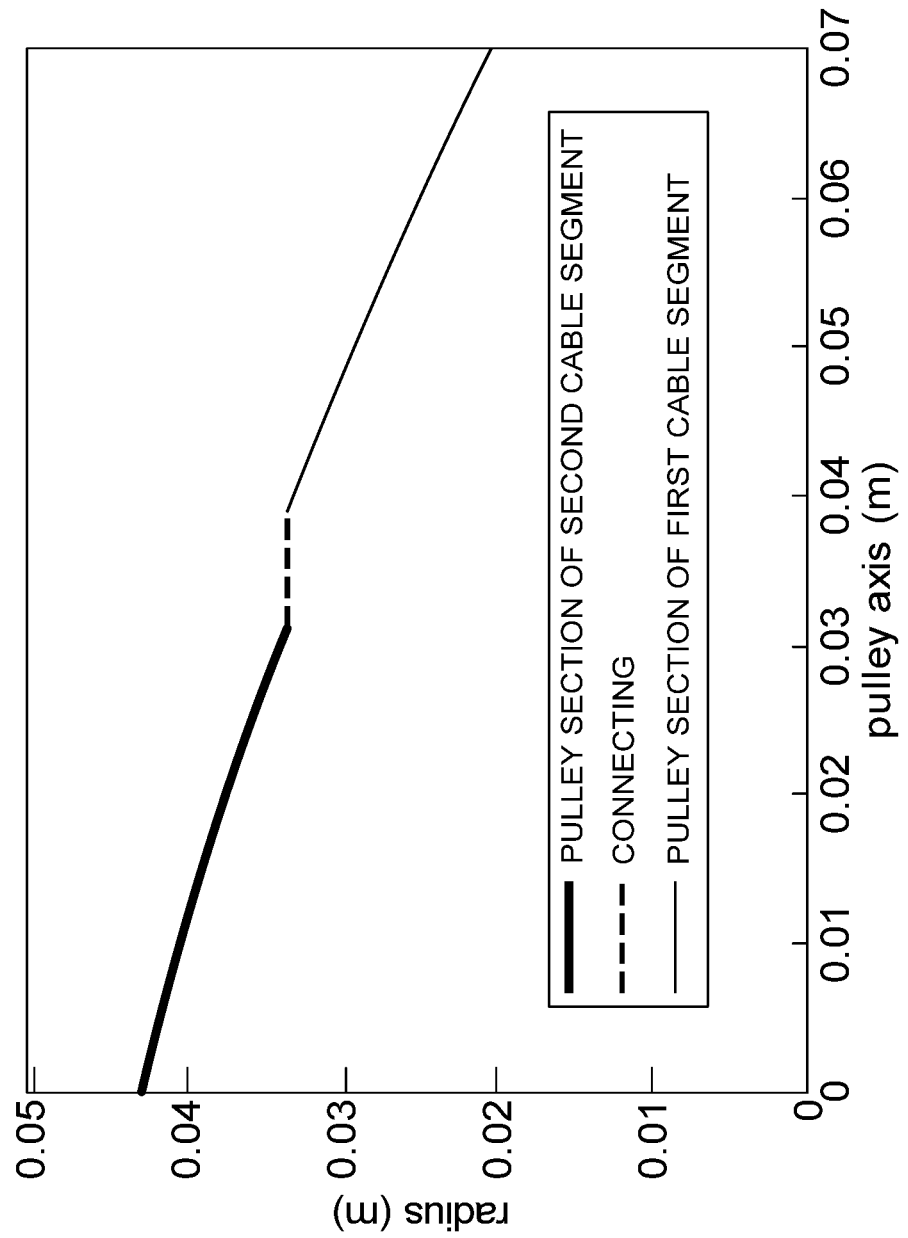
FIG. 5 is a chart detailing the variable radius of the pulley according to the embodiment shown in FIG. 1.

FIG. 5 shows one embodiment of the pulley profile having the variable radius 58 where the first and second guide members 44, 45 are each about 0.2 m in length and positioned on the respective first and second leg members 28, 30 about 0.1 m from the hinge pin 40 of the knee joint 12. In addition, the constant ratio of the rotational angle of the pulley 20 to the rotational angle of the knee joint 12 is 0.5. Accordingly, the variable radius 54 changes with respect to the axis of rotation 60 as shown in FIG. 5. However, due to the stop surface (not shown) at the knee joint 12 limiting the rotation of the knee joint 12, tensions between the first and second cable segments 54, 56 are held constant during rotation of the pulley 20. Thus, the central portion 62 of the pulley 20 is constant as evidenced by the portion of the pulley profile slope having a zero value.

In using the motorized drive unit 10 with the robot 18, motor 26 drives the leg assembly 14 through the support phase and the swing phase. Through the support phase, the motor 26 rotates the pulley 20 the first direction 50, which actuates the elastic cable 22 from the first length to the second length along the predetermined path in the first direction 50. As the pulley 20 rotates the first direction 50, the hip joint 39 rotates the first direction 50, but the knee joint 12 rotates the second direction 52, which increases the angle between the first leg member 28 and the second leg member 30. As such, the leg assembly 14 essentially straightens to support the robot 18. Furthermore, the base member 32 coupled to the second leg member 30 engages the ground as the second leg member 30 rotates about the knee joint 12. This rotation of the knee joint 12 forces the robot 18 forward as the base member 32 engages the ground. The rotation of the knee joint 12 and forward movement continue until the motor 26 ceases to rotate the pulley 20 at which point the elastic cable 22 is stretched to the second length. Accordingly the support phase supports the robot 18 and moves the robot 18 forward across the ground.

Once the support phase is concluded, the motor 26 drives the leg assembly 14 through the swing phase. Through the swing phase, the motor 26 rotates the pulley 20 the second direction 52, which actuates the elastic cable 22 from the second length to the first length along the predetermined path in the second direction 52. As the pulley 20 rotates the second direction 52, the hip joint 20 rotates the second direction 52, but the knee joint 12 rotates the first direction 50, which decreases the angle between the first leg member 28 and the second leg member 30. As such, the leg assembly 14 essentially bends to lift the leg assembly, and, more particularly, the base member, 32 off of the ground. This rotation of the knee joint 12 continues to lift the leg assembly 14 forward along the defined path until the motor 26 ceases to rotate the pulley 20 at which point the elastic cable 22 is released to the first length. The support phase and the swing phase repeat for each leg assembly 14 to walk the robot 18.

Generally, throughout the support and swing phases, the elastic cable 22 absorbs impacts to improve balance and stability with less energy consumption than traditional knee joints. For example, any impact on the leg assembly 14 or robot 18, as whole, is absorbed by the each elastic cable 22, rather than rigidly transferred to rigid structural components of the robot 18, such as the leg assembly 14. Accordingly, the hip joint 39, the knee joint 12, and the ankle joint 34 may be damped to dissipate impacts from the environment or from the motorized drive system 10 for preventing unnecessary oscillation of the leg assembly 14. Furthermore, energy not dissipated by the damping may be stored as potential energy for use as kinetic energy in propelling the body forward to improve efficiency of the motorized drive system 10.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be from such details without departing from the scope or spirit of the general inventive concept.

What is claimed is:

1. A motorized drive system for an articulated joint assembly, the motorized drive system having a surface with a variable radius, the motorized drive system comprising:
    a motor operatively connected to an elastic cable; and
    an articulated joint operatively coupled to said elastic cable, at least a portion of said elastic cable extending along said surface with said variable radius for accommodating an elastically variable length of said elastic cable,
    wherein said motor is configured to actuate said articulated joint via said elastic cable such that one motor is used for each degree of freedom of the articulated joint.

2. The motorized drive system of claim 1 wherein a pulley includes said surface, and the motorized drive system further comprises:
    said pulley mounted to said motor, said pulley engaging the elastic cable and adapted to be rotatably driven by said motor.

3. The motorized drive system of claim 2 wherein said variable radius is adapted to said elastically variable length of the elastic cable for actuating the articulated joint.

4. The motorized drive system of claim 3 wherein a guide groove is positioned on said pulley, said guide groove being configured to direct said variable length of said elastic cable along said variable radius of said pulley.

5. The motorized drive system of claim 1 wherein said articulated joint is actuated by said motor via two of said elastic cables.

6. The motorized drive system of claim 1 further comprising:
    a plurality of guide rings for being operatively affixed to the articulated joint assembly,
    wherein said elastic cable extends through said plurality of guide rings for directing the actuation of said articulated joint along a predetermined path.

7. The motorized drive system of claim 1 wherein the elasticity of the elastic cable accommodates the variation of the elastic cable during full travel, while being adapted to provide the required tension to transfer torque to the articulated joint.

8. An articulated joint assembly and motorized drive system for use with a robot, comprising:
    a main body;
    a motor operatively mounted to said main body;
    a pulley operatively mounted to said main body and configured to be rotatably driven by said motor;
    a first leg member rotatably mounted to said main body at a hip joint;
    a second leg member rotatably mounted to said first leg member at an articulated joint;
    a plurality of guide rings operatively affixed to said first and second leg members;
    an elastic cable extending through said plurality of guide rings, said elastic cable engaging said pulley,
    wherein said plurality of guide rings provide a predetermined path for said elastic cable such that said motor operatively actuates said elastic cable via said pulley to articulate said hip joint and actuate said articulated joint, one motor being used for each degree of freedom of the articulated joint.

9. The articulated joint assembly and motorized drive system of claim 8 further comprising:
    a first guide member having said plurality of guide rings attached thereto, said first guide member and said plurality of guide rings extending perpendicularly from said first leg member; and
    a second guide member having said plurality of guide rings attached thereto, said second guide member and said plurality of guide rings extending perpendicularly from said second leg member;
    wherein said first and second guide members are respectively affixed to said first and second leg members such that said articulated joint is positioned therebetween.

10. The articulated joint assembly and motorized drive system of claim 9 wherein said elastic cable is adapted to slide through a first portion of said plurality of guide rings.

11. The articulated joint assembly and motorized drive system of claim 10 wherein said elastic cable is affixed to a second portion of said plurality of guide rings, said second portion of said plurality of guide rings being attached to said second guide member.

12. The articulated joint assembly and motorized drive system of claim 8 further comprising a base member, said base member being rotatably attached to said second leg member at an ankle joint.

13. The articulated joint assembly and motorized drive system of claim 8 wherein said motor is directly mounted to said main body.

14. The articulated joint assembly and motorized drive system of claim 13 wherein said pulley is directly mounted to said motor.

15. The articulated joint assembly and motorized drive system of claim 8 wherein said pulley has a variable radius and said elastic cable has an elastically variable length, said variable radius adapted to said elastically variable length of the elastic cable for actuating the articulated joint.

16. The articulated joint assembly and motorized drive system of 15 wherein a guide groove is positioned on said pulley, said guide groove being configured to direct said variable length of said elastic cable along said variable radius of said pulley.

17. The articulated joint assembly and motorized drive system of claim 8 wherein the elasticity of the elastic cable accommodates the variation of the elastic cable during full travel, while providing the required tension to transfer torque to the articulated joint.

18. The method of actuating an articulated joint having a first leg member connected to articulate relative to a second leg member at the articulated joint with a motorized drive system, comprising:
    actuating an elastic cable along a surface with a variable radius, the elastic cable operatively connected to a motorized drive unit and the articulated joint;
    elastically stretching the elastic cable from a first length to a second length; and
    actuating the articulated joint with one motor for each degree of freedom of the articulated joint.

19. The method of claim 18 further comprising:
    elastically releasing the elastic cable from the second length to the first length.

20. The method of claim 18 further comprising:
    guiding the elastic cable with a plurality of guide rings; and
    actuating the articulated joint along a defined path.

* * * * *